(12) United States Patent
Pettus et al.

(10) Patent No.: US 8,523,272 B1
(45) Date of Patent: Sep. 3, 2013

(54) PANEL ASSEMBLY FOR A VEHICLE AND A METHOD OF SUPPORTING THE PANEL ASSEMBLY

(75) Inventors: James D. Pettus, Grand Blanc, MI (US); Michael J. Green, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/487,724

(22) Filed: Jun. 4, 2012

Related U.S. Application Data

(60) Provisional application No. 61/610,833, filed on Mar. 14, 2012.

(51) Int. Cl.
*B60N 99/00* (2006.01)

(52) U.S. Cl.
USPC .................................................. 296/187.02

(58) Field of Classification Search
USPC ................................. 296/187.01, 187.02, 191
See application file for complete search history.

(56) References Cited

U.S. PATENT DOCUMENTS

| | | | | |
|---|---|---|---|---|
| 6,419,305 B1 * | 7/2002 | Larsen | ...................... | 296/203.03 |
| 7,364,221 B2 * | 4/2008 | Tahri et al. | ................ | 296/187.02 |
| 7,838,100 B2 * | 11/2010 | McLeod et al. | ................ | 428/172 |
| 8,070,204 B2 * | 12/2011 | Mourou | ........................ | 296/1.08 |
| 2004/0124666 A1 * | 7/2004 | Stahl | .......................... | 296/187.02 |

* cited by examiner

*Primary Examiner* — Lori Lyjak
(74) *Attorney, Agent, or Firm* — Quinn Law Group, PLLC

(57) ABSTRACT

A panel assembly for a vehicle and a method of supporting the panel assembly is disclosed. The panel assembly includes a first wall and a bracket adjacent to the first wall. The bracket has a first platform facing the first wall. The panel assembly further includes a first support member attached to the first platform and defining an initial state and a final state. The first support member and the first wall define a first gap therebetween when in the initial state. The first support member is expandable to contact the first wall to remove the first gap when in the final state for supporting the first wall to prevent deformation of the first wall.

18 Claims, 4 Drawing Sheets

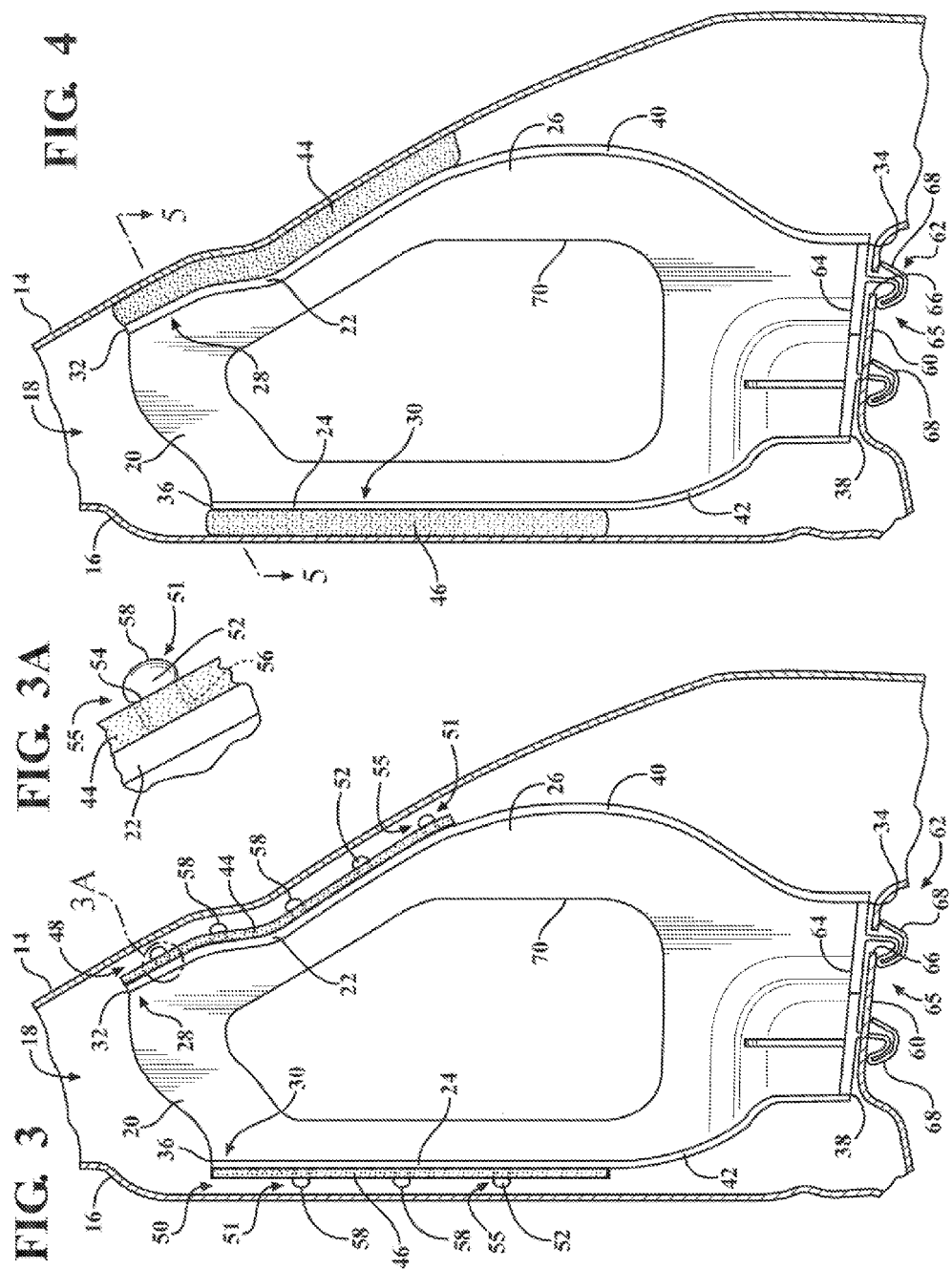

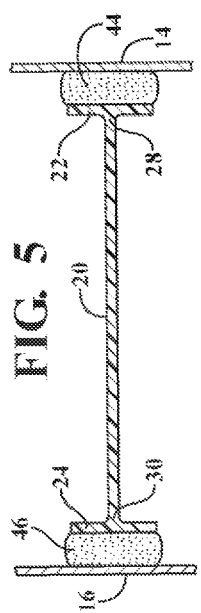
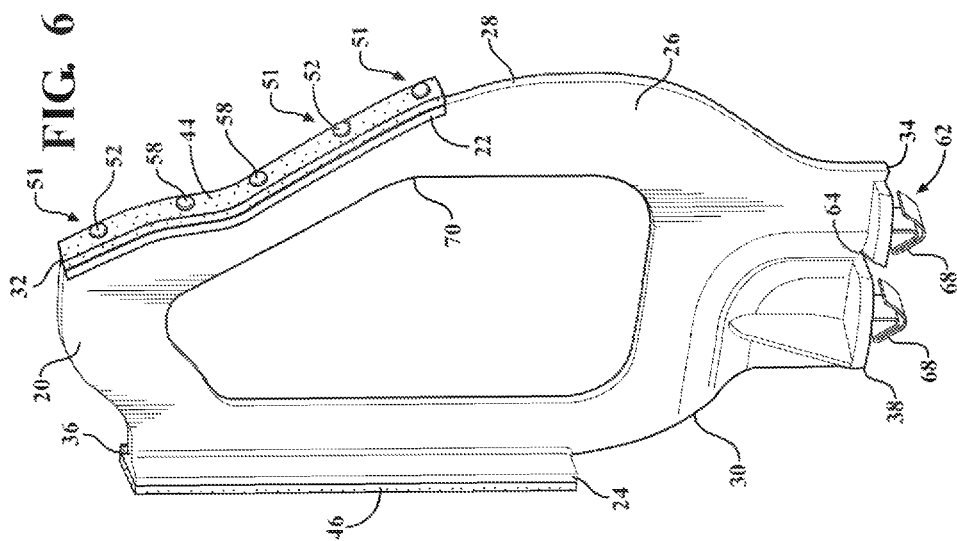
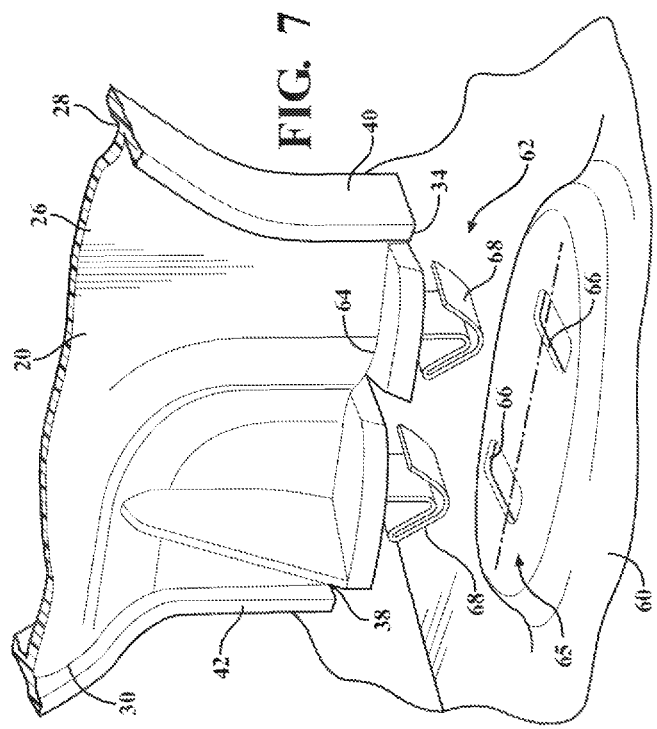

PANEL ASSEMBLY FOR A VEHICLE AND A METHOD OF SUPPORTING THE PANEL ASSEMBLY

CROSS-REFERENCE TO RELATED APPLICATIONS

This application claims the benefit of U.S. Provisional Application No. 61/610,833, filed on Mar. 14, 2012, which is hereby incorporated by reference in its entirety.

TECHNICAL FIELD

The present disclosure relates to a panel assembly for a vehicle and a method of supporting the panel assembly.

BACKGROUND

Vehicles may include body panels, such as fenders, made of metal. A bulkhead or plate, made of metal, can be welded to one of the body panels to provide support to the body panel. Welding the bulkhead to one of the body panels can affect the aesthetic appearance of the panel. Furthermore, forming the body panels and the bulkhead of metal affects the weight of the vehicle and thus could influence fuel efficiency of the vehicle.

SUMMARY

The present disclosure provides a panel assembly for a vehicle. The panel assembly includes a first wall and a bracket adjacent to the first wall. The bracket has a first platform facing the first wall. The panel assembly further includes a first support member attached to the first platform and defining an initial state and a final state. The first support member and the first wall define a first gap therebetween when in the initial state. The first support member is expandable to contact the first wall to remove the first gap when in the final state for supporting the first wall to prevent deformation of the first wall.

The present disclosure also provides a vehicle including a component and a panel assembly coupled to the component. The panel assembly includes a first wall and a bracket adjacent to the first wall. The bracket has a first platform facing the first wall. The panel assembly also includes a first support member attached to the first platform and defining an initial state and a final state. The first support member and the first wall define a first gap therebetween when in the initial state. The first support member is expandable to contact the first wall to remove the first gap when in the final state for supporting the first wall to prevent deformation of the first wall.

The present disclosure further provides for a method of supporting a panel assembly for a vehicle. The method comprises positioning a bracket adjacent to a first wall and attaching a first support member to a first platform of the bracket with the first support member in an initial state. The method also comprises facing the first support member toward the first wall to define a first gap therebetween, heating the first support member, and expanding the first support member to a final state during heating of the first support member to contact the first wall to remove the first gap and support the first wall to prevent deformation of the first wall.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 3 is a schematic cross-sectional view of a first wall, a second wall, and a third wall with a first support member and a second support member in an initial state.

FIG. 3A is a schematic enlarged view of the first support member and a post taken from the cross-sectional view of FIG. 3.

FIG. 4 is a schematic cross-sectional view of the first, second, and third walls with the first and second support members in a final state.

FIG. 5 is a schematic cross-sectional view of a bracket, the first and second walls, and the first and second support members taken along lines 5-5 of FIG. 4.

FIG. 6 is a schematic perspective view of an alternative bracket.

FIG. 7 is a schematic exploded view of the bracket of FIG. 3 and the third wall with a plurality of first coupling members of the bracket aligning with corresponding second coupling members of the third wall.

DETAILED DESCRIPTION

Figure 1:
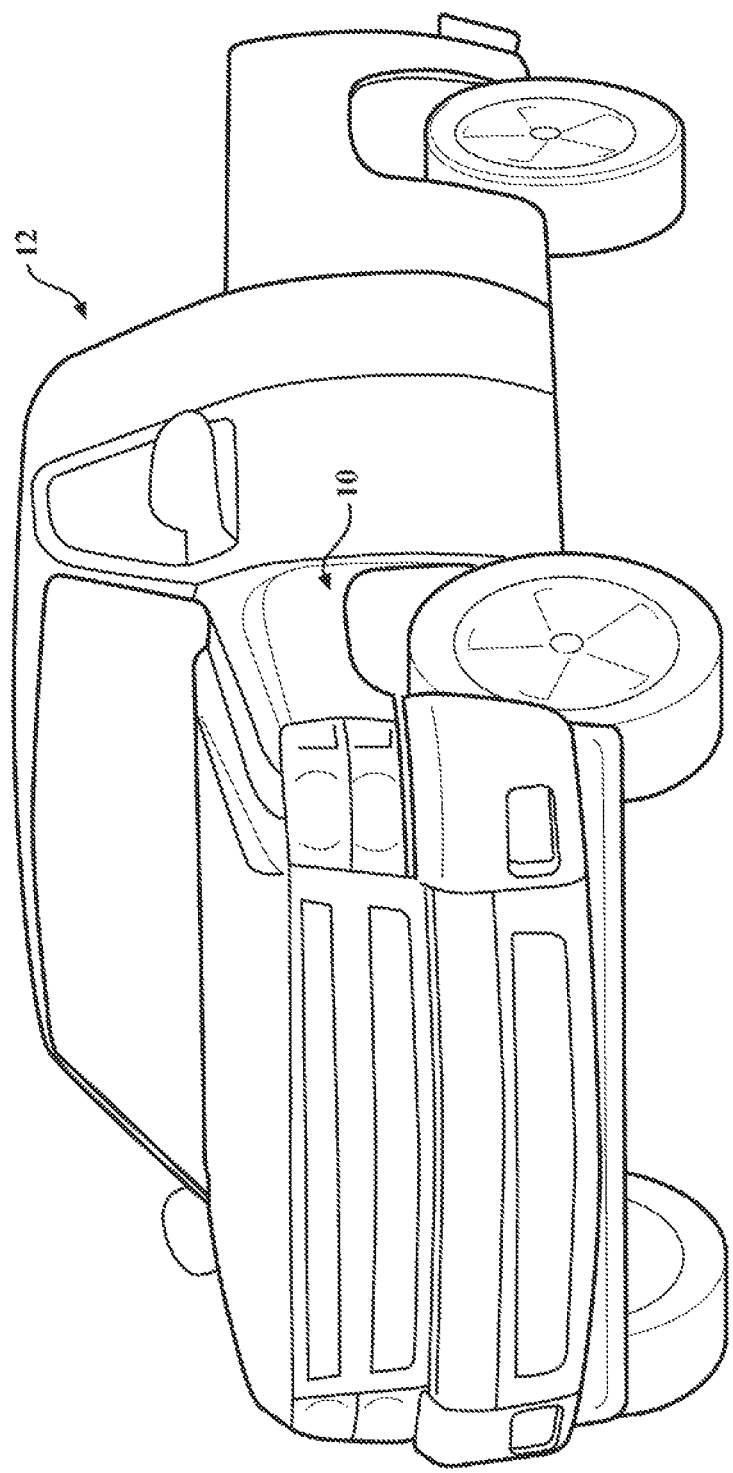
FIG. 1 is a schematic perspective view of a vehicle and a panel assembly.
Figure 2:
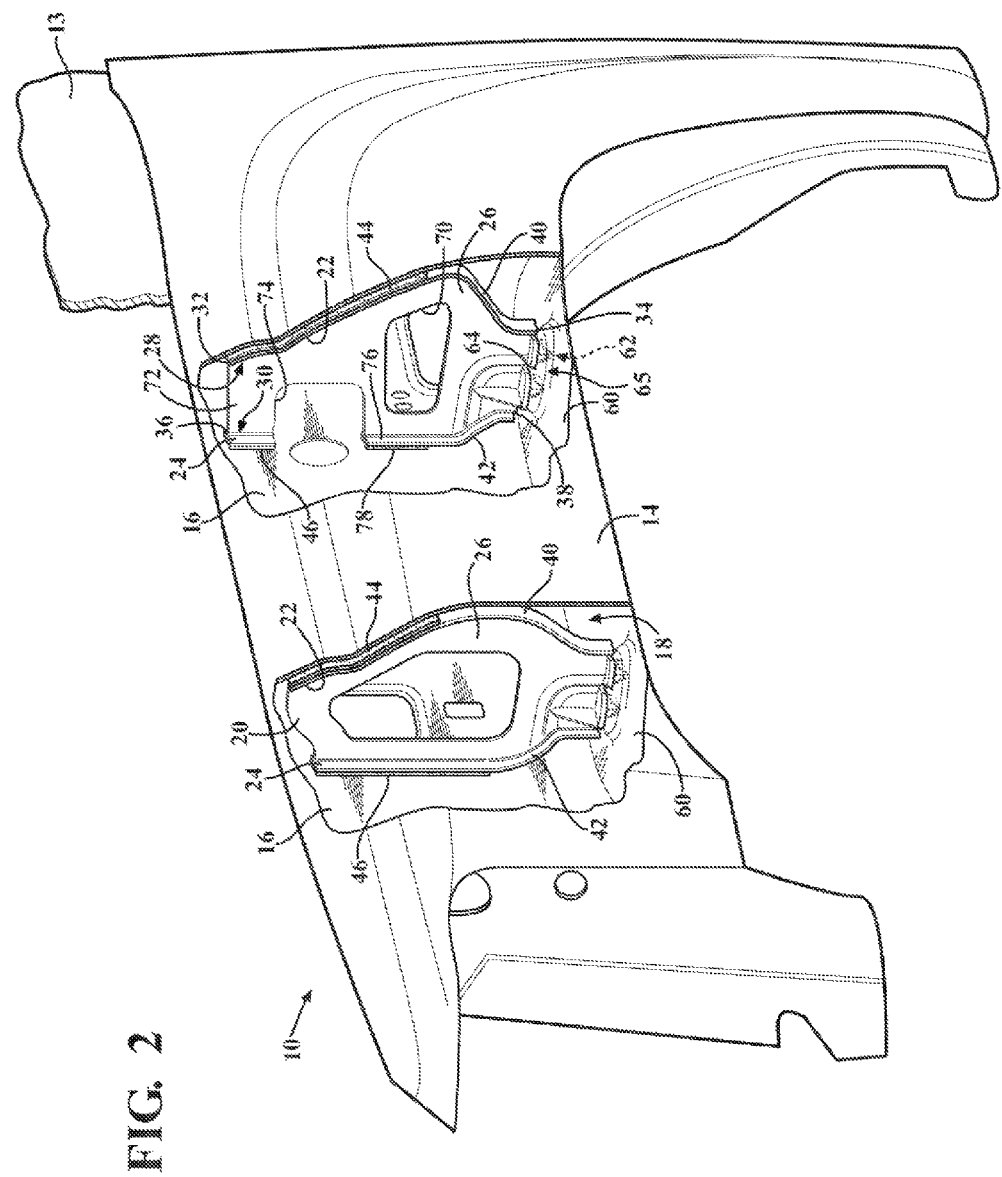
FIG. 2 is a schematic cut-away perspective view of the panel assembly.

Referring to the Figures, wherein like numerals indicate like or corresponding parts throughout the several views, a panel assembly 10 for a vehicle 12 is generally shown in FIGS. 1 and 2. The vehicle 12 can be a truck as illustrated in FIG. 1, in one non-limiting example. It is to be appreciated that the vehicle 12 can be a car or any other suitable vehicle 12. Furthermore, the panel assembly 10 can be utilized for a fender of the vehicle 12, as shown in FIG. 1, or any other panel(s) of the vehicle 12.

The vehicle 12 includes a component 13 and the panel assembly 10 coupled to the component 13. More specifically, the panel assembly 10 can be attached to the component 13 such that the component 13 supports the panel assembly 10. The component 13 can be further defined as a pillar, such as an A-pillar; a frame; a body, such as a body side panel; a rail, such as a front motor rail, and/or any other suitable component to couple the panel assembly 10 thereon. It is to be appreciated that the panel assembly 10 can be coupled or attached to the component 13 by any suitable method(s) and/or component(s), such as, for example, couplers, fasteners, tabs, barbs, knobs, adhesive, etc.

Referring to FIGS. 2-4, the panel assembly 10 includes a first wall 14 and can further include a second wall 16 spaced from the first wall 14 to define an opening 18 therebetween. Hence, the first and second walls 14, 16 can cooperate to form the fender of the vehicle 12. The first wall 14 is generally referred to as an exterior or outer body panel which a user can view from the exterior of the vehicle 12. The second wall 16 is generally referred to as an interior or inner body panel which is not readily viewable by the user from the exterior of the vehicle 12.

In certain embodiments, the first and second walls 14, 16 are formed from metal. Generally, the first and second walls 14, 16 are formed from sheet metal and can be any suitable configuration. It is desirable to reduce a thickness of the first and second walls 14, 16 for reducing weight of the vehicle 12. In other words, it is desirable to form the first and second walls 14, 16 of a thin gage material or thin gage sheet metal. Reducing the weight of the vehicle 12 can improve fuel efficiency of the vehicle 12, reduce material costs, etc.

The panel assembly 10 further includes a bracket 20 adjacent to the first wall 14. More specifically, the bracket 20 is disposed in the opening 18 between the first and second walls 14, 16. Generally, the bracket 20 supports the first and second walls 14, 16. The bracket 20 provides strength to the first and second walls 14, 16 which therefore allows the thickness of the first and second walls 14, 16 to be reduced. Hence, when a load is applied to the first and/or second walls 14, 16, the bracket 20 provides strength to the walls 14, 16 to counter the load and prevent deformation of the walls 14, 16. In other words, when a force is applied transverse or perpendicular to a face of the first and/or second walls 14, 16, the bracket 20 provides strength to the walls 14, 16 to counter the force and prevent deformation of the walls 14, 16.

In certain embodiments, the bracket 20 is formed from a polymer. In one embodiment, the polymer is nylon. It is to be appreciated that the bracket 20 can be formed from polymers other than nylon. Furthermore, the bracket 20 can be formed by any other suitable material(s). Generally, the bracket 20 can be molded or formed from any suitable method. Forming the bracket 20 from a polymer provides a light weight component which can also reduce the weight of the vehicle 12. As discussed above, reducing the weight of the vehicle 12 can improve fuel efficiency of the vehicle 12, etc.

The bracket 20 has a first platform 22 facing the first wall 14 and can further have a second platform 24 facing the second wall 16. As shown in FIG. 5, at least a portion of the bracket 20 defines a generally I-shaped cross-sectional configuration for providing strength to the bracket 20. Specifically, the first and second platforms 22, 24 cooperate with a body portion 26 of the bracket 20 to define the generally I-shaped cross-sectional configuration. Hence, as discussed above, when the load is applied to the first and/or second walls 14, 16, the bracket 20 provides strength to the walls 14, 16 to counter the load and prevent deformation of the walls 14, 16. It is to be appreciated that the first and second platforms 22, 24, can be attached to the bracket 20 by any suitable method(s) and/or component(s). For example, the first and second platforms 22, 24 can be integrally formed to the bracket 20. In other words, the bracket 20 and the first and second platforms 22, 24 can be molded together.

Referring back to FIGS. 2-4, generally, the bracket 20 includes a first edge 28 facing the first wall 14 with the first platform 22 extending from the first edge 28. The bracket 20 also includes a second edge 30 facing the second wall 16 with the second platform 24 extending from the second edge 30. The first edge 28 includes a first end 32 and a second end 34 spaced from each other. Similarly, the second edge 30 includes a first end 36 and a second end 38 spaced from each other.

The bracket 20 can further include a first flange 40 or first rib adjacent to the first platform 22 for minimizing bending of the bracket 20. The first flange 40 is disposed between the first platform 22 and the second end 34 of the first edge 28. Furthermore, the first platform 22 is disposed between the first end 32 of the first edge 28 and the first flange 40. Therefore, the first flange 40 and the first platform 22 are disposed between the first and second ends 32, 34 of the first edge 28. In certain embodiments, the first platform 22 and the first flange 40 can be continuous with each other. Furthermore, the first platform 22 and the first flange 40 can be the same configuration. As such, the first flange 40 and the bracket 20 can cooperate to also define a generally I-shaped cross-sectional configuration. It is to be appreciated that the first flange 40 and the first platform 22 can be any suitable configuration and location; for example, the first flange 40 can be spaced from the first platform 22, etc.

Additionally, the bracket 20 can include a second flange 42 or second rib adjacent to the second platform 24 for minimizing bending of the bracket 20. The second flange 42 is disposed between the second platform 24 and the second end 38 of the second edge 30. Furthermore, the second platform 24 is disposed between the first end 36 of the second edge 30 and the second flange 42. Therefore, the second flange 42 and the second platform 24 are disposed between the first and second ends 36, 38 of the second edge 30. In certain embodiments, the second platform 24 and the second flange 42 can be continuous with each other. Furthermore, the second platform 24 and the second flange 42 can be the same configuration. As such, the second flange 42 and the bracket 20 can cooperate to also define a generally I-shaped cross-sectional configuration. It is to be appreciated that the second flange 42 and the second platform 24 can be any suitable configuration and location; for example the second flange 42 can be spaced from the second platform 24, etc. In addition, any suitable number of flanges 40, 42 can be utilized with the bracket 20. Thus, one of the first and second flanges 40, 42 can be removed from the bracket 20. Furthermore, as shown in FIG. 6, both of the first and second flanges 40, 42 of the bracket 20 can be eliminated. It is to be appreciated that the first and second flanges 40, 42, can be attached to the bracket 20 by any suitable method(s) and/or component(s). For example, the first and second flanges 40, 42 can be integrally formed to the bracket 20. In other words, the bracket 20 and the first and second flanges 40, 42 can be molded together. Therefore, the bracket 20, the first and second platforms 22, 24, the first and second flanges 40, 42 can be molded together.

As discussed above, the first and second flanges 40, 42 minimize bending of the bracket 20. Therefore, the first and second flanges 40, 42 provide rigidity to the bracket 20. For example, during the painting process of at least one of the first and second walls 14, 16, heat is applied, which correspondingly heats the bracket 20. Generally, the bracket 20 is orientated either horizontally or vertically, depending on space constraints etc., during this heating process which can cause the bracket 20 to bend. The first and/or second flanges 40, 42 minimize bending of the bracket 20 during this heating process. The heating process can take place in an oven, such as, for example, a paintshop electrodeposition coating (e-coat) bake oven or a finish coat paint oven. It is to be appreciated that the flanges 40, 42 can provide other advantages than discussed above.

The panel assembly 10 further includes a first support member 44 attached to the first platform 22 and can further include a second support member 46 attached to the second platform 24. More specifically, the first support member 44 is coupled to the first edge 28 and the second support member 46 is coupled to the second edge 30. Therefore, the first support member 44 faces the first wall 14 and the second support member 46 faces the second wall 16. Generally, the first and second support members 44, 46 are cut into strips which are attached to the first and second platforms 22, 24, respectively. It is to be appreciated that optionally, the first platform 22 can include a top portion and a bottom portion spaced from the top portion and each extending therefrom substantially parallel to each other with the first support member 44 disposed between the top and bottom portions of the first platform 22. Similarly, it is to be appreciated that optionally, the second platform 24 can include a top portion and a bottom portion spaced from the top portion and each extending therefrom substantially parallel to each other with the second support member 46 disposed between the top and the bottom portions of the second platform 24.

The first and second support members 44, 46 each define an initial state and a final state. The final state of the first and second support members 44, 46 is when the first and second support members 44, 46 expand as further discussed below. Therefore, the initial state is prior to expansion of the first and second support members 44, 46. The initial state is shown in FIGS. 3 and 6. The final state is shown in FIGS. 2, 4, and 5.

In certain embodiments, the first and second support members 44, 46 are each formed from a sealant. A volume of the sealant is changeable by from about 200% to about 1,000% when heating the sealant. Generally, heat activates the expansion properties of the sealant. In various embodiments, the volume of the sealant is changeable by from about 850% to about 950% when heating the sealant. In another embodiment, the volume of the sealant is changeable by from about 900% when heating the sealant. Therefore, the sealant can expand to the final state, and hence, the final state is when the sealant is heated and expands to contact the first and/or second walls 14, 16. As such, an amount of expandability of the sealant can be controlled. As used herein, the final state refers to the expanded state of the sealant, wherein the volume of the sealant has increased by from about 200% to about 1,000% as compared to a volume of the initial state prior to heating the sealant.

Specifically, the sealant can change shape, size, volume, etc. The sealant provides characteristics of a preformed, expanding, high bake, and non-tacky sealer. The sealant is generally formed from a smooth and homogenous mixture before baking Therefore, the sealant is generally free of air, lumps, and unmixed particles and foreign materials. Heat is applied to the first and second support members 44, 46 to bake the first and second support members 44, 46 and thereby expand the first and second support members 44, 46 to the final state. In other words, when high baking the first and second support members 44, 46, the first and second support members 44, 46 expand to the final state and adhere, bond, and/or join to the first and second walls 14, 16 respectively. As such, the sealant can be an adhesive.

In certain embodiments, high baking of the sealant can be defined as about 20 minutes to about 30 minutes at about 150° C. to about 160° C. In one embodiment, high baking of the sealant can be defined as about 25 minutes at about 157° C. In other embodiments, high baking of the sealant can be defined as for longer than about 25 minutes at about 110° C. to about 120° C. In another embodiment, high baking of the sealant can be defined as for longer than about 25 minutes at about 115° C. It is to be appreciated that heat/high baking of the sealant can be applied during the painting process as discussed above. It is to further be appreciated that heat/high baking of the sealant can occur at any suitable time. It is to also be appreciated that the sealant can have other properties/characteristics not specifically discussed above. In addition, it is to be appreciated that the time and temperature ranges can change depending on the desired stiffness properties of the sealant. Generally, the first and second support members 44, 46 can be formed from any suitable material(s), such as, for example, sealant, adhesive, etc.

Turning to FIGS. 3 and 4, the first support member 44 and the first wall 14 define a first gap 48 therebetween when in the initial state. The first support member 44 is expandable to contact the first wall 14 to remove the first gap 48 when in the final state for supporting the first wall 14 to prevent deformation of the first wall 14. In other words, when in the final state, the first support member 44 contacts the first wall 14 to adhere, bond, and/or join to the first wall 14.

Similarly, the second support member 46 and the second wall 16 define a second gap 50 therebetween when in the initial state. The second support member 46 is expandable to contact the second wall 16 to remove the second gap 50 when in the final state for sandwiching the bracket 20 and the first and second support members 44, 46 between the first and second walls 14, 16 when in the final state to support the first and second walls 14, 16 to prevent deformation of at least the first wall 14, and more specifically, to prevent deformation of the first and second walls 14, 16. In other words, when in the final state, the second support member 46 contacts the second wall 16 to adhere, bond, and/or join to the second wall 16. Hence, the first and second support members 44, 46 are adhered, bonded, and/or joined to the first and second walls 14, 16 respectively such that the bracket 20 supports the first and second walls 14, 16. Therefore, the first support member 44 is generally sandwiched between the first platform 22 of the bracket 20 and the first wall 14 when in the final state, and similarly, the second support member 46 is sandwiched between the second platform 24 of the bracket 20 and the second wall 16 when in the final state. As such, the bracket 20 and the first and second support members 44, 46 form a support structure for the first and second walls 14, 16 when in the final state. It is to be appreciated that the volume percentages as discussed above are for illustrative purposes to set forth examples that the first and second support members 44, 46 substantially fill the first and second gaps 48, 50 respectively.

Additionally, the first and second support members 44, 46 are adhered, bonded, and/or joined to the first and second walls 14, 16 respectively to maintain the orientation of the bracket 20. In addition, the first and second support members 44, 46 have stiffness properties to allow the first and second support members 44, 46 to support the first and second walls 14, 16; and the stiffness properties also allow the first and second support members 44, 46 to be pliable to prevent surface imperfections to the exterior surfaces of the first and second walls 14, 16 when in the final state. In certain embodiments, the first and second support members 44, 46 and the bracket 20 will provide a stiffness to the first wall 14 from about 80 N/mm to about 120 N/mm. Furthermore, the first and second support members 44, 46 are expandable to contact the first and second walls 14, 16 respectively without welding these components together. In other words, the first and second support members 44, 46 are adhered, bonded, and/or joined to the first and second walls 14, 16 respectively without welding the bracket 20 to the walls 14, 16. In some instances, welding the bracket 20 to the walls 14, 16 can create surface imperfections to the exterior surfaces of the walls 14, 16.

When the load is applied to one or both of the first and second walls 14, 16, the bracket 20 provides strength to the walls 14, 16 to counter the load and prevent deformation of the walls 14, 16. As such, for example, when the force is applied transverse or perpendicular to the face of the first wall 14, the force is transmitted to the bracket 20 through the first support member 44 which provides strength to the first wall 14 to counter the force and prevent deformation of the first wall 14, and thus maintaining the aesthetic appearance of the exterior surfaces of the walls 14, 16. Therefore, for example, the bracket 20 and the first and second support members 44, 46 cooperate such that the first wall 14 presents a rigid feel or stiffness of a thicker gage material even though the first wall 14 is formed of a thinner gage material.

Also referring to FIG. 3A, the first and second platforms 22, 24 each include at least one first coupler 51, and more specifically, a plurality of first couplers 51 spaced from each other. The first couplers 51 of the first platform 22 are spaced from the first wall 14 and the first couplers 51 of the second platform 24 are spaced from the second wall 16.

In certain embodiments, the first couplers 51 are further defined as a plurality of posts 52 spaced from each other. The posts 52 each extend to a respective distal end 54 with the posts 52 of the first platform 22 spaced from the first wall 14 and the posts 52 of the second platform 24 spaced from the second wall 16. Therefore, the posts 52 of the first platform 22 extend toward the first wall 14 and the posts 52 of the second platform 24 extend toward the second wall 16.

The first and second support members 44, 46 each include at least one second coupler 55, and more specifically, a plurality of second couplers 55 spaced from each other. The second couplers 55 of the first and second support members 44, 46 cooperate with the first couplers 51 of the first and second platforms 22, 24 respectively to attach the first and second support members 44, 46 to the first and second platforms 22, 24.

In certain embodiments, the second couplers 55 are further defined as a plurality of apertures 56 spaced from each other for receiving the posts 52 of the first and second platforms 22, 24 respectively to attach the first and second support members 44, 46 to the first and second platforms 22, 24 respectively. As shown in FIG. 3, the distal end 54 of each of the posts 52 are exposed when the first and second support members 44, 46 are in the initial state. As shown in FIG. 4, the distal end 54 of each of the posts 52 are concealed when the first and second support members 44, 46 are in the final state. In other words, the first and second support members 44, 46 expand over respective posts 52 when in the final state. It is to be appreciated that optionally, the distal end 54 of each of the posts 52 can have a bulb 58 or head for retaining the first and second support members 44, 46 on the respective posts 52. It is to further be appreciated that the first and second support members 44, 46 can be attached to the first and second platforms 22, 24 respectively by any suitable method(s) and/or component(s), such as, for example, couplers, fasteners, tabs, barbs, knobs, adhesive, co-molding the first and second support members 44, 46 to the first and second platforms 22, 24, etc. Therefore, it is to be appreciated that the first and second couplers 51, 55 can be defined as couplers, fasteners, tabs, barbs, knobs, apertures, etc., or the first and second couplers 51, 55 be configured to allow the first and second support members 44, 46 to be attached to the first and second platforms 22, 24 by adhesive, co-molding, etc. It is to also be appreciated that the component(s) to attach the first and second support members 44, 46 to the first and second platforms 22, 24 can be any suitable configuration and location.

The panel assembly 10 can further include a third wall 60 disposed transverse to the first and second walls 14, 16 to further define the opening 18. Hence, the first, second, and third walls 14, 16, 60 cooperate to form, for example, the fender of the vehicle 12. The bracket 20 is attached to the third wall 60 for orientating the bracket 20 relative to the first and second walls 14, 16. Specifically, the bracket 20 includes a plurality of first coupling members 62 spaced from each other for securing the bracket 20 to the third wall 60. As such, the bracket 20 can be secured to the third wall 60 without welding these components together. Furthermore, the first coupling members 62 orientate the bracket 20 relative to the first and second walls 14, 16 when the first and second support members 44, 46 are in the initial state.

Additionally, the bracket 20 further includes a third edge 64 with the first coupling members 62 extending from the third edge 64. The third edge 64 is disposed between the first and second edges 28, 30 and faces the third wall 60. Specifically, the third edge 64 is adjacent to the second ends 34, 38 of the first and second edges 28, 30. Generally, the third edge 64 abuts the second ends 34, 38 of the first and second edges 28, 30.

Each of the first coupling members 62 are spaced from the first and second platforms 22, 24. Furthermore, the third wall 60 includes a plurality of second coupling members 65 spaced from each other for cooperating with respective first coupling members 62 to secure the bracket 20 to the third wall 60. In certain embodiments, the second coupling members 65 are further defined as a plurality of holes 66 spaced from each other for receiving respective first coupling members 62 to secure the bracket 20 to the third wall 60.

Turning to FIG. 7, the first coupling members 62 can be offset from each other for stabilizing the bracket 20 when attached to the third wall 60. Correspondingly, the second coupling members 65, and more specifically, the holes 66 of the third wall 60 can be offset from each other to cooperate with the first coupling members 62. It is to be appreciated that the first and second coupling members 62, 65 can be any suitable location and configuration; for example, the first coupling members 62 can be mounted or attached to the third wall 60 and the bracket 20 can define the holes 66 for receiving the first coupling members 62; and as another example, the first coupling members 62 can extend from the second edge 30 of the bracket 20 such that the first coupling members 62 engage the second wall 16 instead of the third wall 60, etc. When attaching the bracket 20 to the second wall 16, the second wall 16 defines the holes 66, etc. Therefore, the third wall 60 is optional when attaching the bracket 20 to the second wall 16.

In certain embodiments, the first coupling members 62 are further defined as a plurality of hooks 68 engaging the holes 66. Specifically, the hooks 68 secure the bracket 20 to the third wall 60. The hooks 68 are offset from each other for stabilizing the bracket 20 when attached to the third wall 60. In one embodiment, the hooks 68 extend from the third edge 64. It is to be appreciated that the first coupling members 62 can be defined as tabs, fasteners, fir-tree fasteners, couplers, barbs, bulbs, knobs, or any other suitable coupling members to secure the bracket 20 to the second or third walls 16, 60.

Optionally, the bracket 20 defines a hollow 70 disposed between the first, second, and third edges 28, 30, 64 for reducing mass of the bracket 20. More specifically, the body portion 26 of the bracket 20 can define the hollow 70. It is to be appreciated that the hollow 70 can be any suitable location and configuration.

As shown in FIG. 2, in certain embodiments, the bracket 20 is further defined as a first bracket 20 and the panel assembly 10 can further include a second bracket 72 spaced from the first bracket 20. Hence, the panel assembly 10 can utilize one or more brackets 20, 72 such that one or more brackets 20, 72 can be disposed in the fender(s), etc. Additionally, one or more first brackets 20 can be utilized, and similarly, one or more second brackets 72 can be utilized. Therefore, an amount of stiffness of the first and/or second walls 14, 16 can be changed depending on the location and number of brackets 20, 72 utilized. The first and second brackets 20, 72 can be configured differently as shown in FIG. 2. It is to be appreciated that the first and second brackets 20, 72 can be substantially the same configuration. It is to further be appreciated that the second bracket 72 can be utilized without the first bracket 20 and vice versa.

The second bracket 72 includes many of the same features as discussed above, and therefore, the same reference numerals are utilized for like or corresponding parts. As such, the primary differences between the first and second brackets 20, 72 are discussed below. It is to be appreciated that the first and/or second flanges 40, 42 can be removed from the second bracket 72 as discussed above for the bracket 20 of FIG. 6.

The second bracket 72 defines a cutout 74 along the second edge 30 to provide access to the opening 18 between the first and second walls 14, 16. Specifically, the cutout 74 is defined between the first and second ends 36, 38 of the second edge 30.

The second bracket 72 includes a third platform 76 and a third support member 78 attached to the third platform 76. The cutout 74 is disposed between the second and third platforms 24, 76, and thus, the second and third platforms 24, 76 are spaced from each other. The third platform 76 faces the second wall 16 and extends from the second edge 30. Therefore, the third support member 78 faces the second wall 16. Generally, the third platform 76 is disposed between the first and second ends 36, 38 of the second edge 30. In certain embodiments, the third platform 76, and thus the third support member 78 is adjacent to the cutout 74. It is to be appreciated that the third platform 76 and thus the third support member 78 can be any suitable configuration and location.

The third support member 78 includes the same features as discussed above for the first and second support members 44, 46 and therefore will not be re-discussed. The third support member 78 is attached to the third platform 76 as discussed above for the first and second platforms 22, 24 and therefore will not be re-discussed. In addition, the present disclosure contemplates a method of supporting the first and/or second walls 14, 16 as described above. In other words, the present disclosure includes a method of supporting the panel assembly 10 for the vehicle 12. For example, the method comprises positioning the bracket 20 adjacent to the first wall 14, and attaching the first support member 44 to the first platform 22 of the bracket 20 with the first support member 44 in the initial state. The method further comprises facing the first support member 44 toward the first wall 14 to define the first gap 48 therebetween, heating the first support member 44, and expanding the first support member 44 to the final state during heating of the first support member 44 to contact the first wall 14 to remove the first gap 48 and support the first wall 14 to prevent deformation of the first wall 14. Generally, the first support member 44 is attached to the first platform 22 before positioning the bracket 20 adjacent to the first wall 14.

The method further comprises attaching the second support member 46 to the second platform 24 of the bracket 20 with the second support member 46 in the initial state. The method also comprises facing the second support member 46 toward the second wall 16 to define the second gap 50 therebetween, heating the second support member 46, and expanding the second support member 46 to the final state during heating of the second support member 46 to contact the second wall 16 to remove the second gap 50 and sandwich the bracket 20 and the first and second support members 44, 46 between the first and second walls 14, 16 when in the final state to support the first and second walls 14, 16 to prevent deformation of at least the first wall 14. Generally, the second support member 46 is attached to the second platform 24 before positioning the bracket 20 adjacent to the first wall 14. Furthermore, heating the first and second support members 44, 46 can be performed simultaneously, and thus expanding the first and second support members 44, 46 can be performed simultaneously. Heating of the first and second support members 44, 46 can occur during the painting process as discussed above, or can occur at any other suitable time.

While the best modes for carrying out the disclosure have been described in detail, those familiar with the art to which this disclosure relates will recognize various alternative designs and embodiments for practicing the disclosure within the scope of the appended claims.

What is claimed is:

1. A panel assembly for a vehicle, the assembly comprising:
   a first wall;
   a bracket adjacent to the first wall and having a first platform facing the first wall; and
   a first support member attached to the first platform and defining an initial state and a final state, with the first support member and the first wall defining a first gap therebetween when in the initial state, and the first support member being expandable to contact the first wall to remove the first gap when in the final state for supporting the first wall to prevent deformation of the first wall.

2. An assembly as set forth in claim 1 further including a second wall spaced from the first wall to define an opening therebetween with the bracket disposed in the opening between the first and second walls.

3. An assembly as set forth in claim 2 wherein the bracket has a second platform facing the second wall and further including a second support member attached to the second platform with the second support member defining an initial state and a final state with the second support member and the second wall defining a second gap therebetween when in the initial state and the second support member being expandable to contact the second wall to remove the second gap when in the final state for sandwiching the bracket and the first and second support members between the first and second walls when in the final state to support the first and second walls to prevent deformation of at least the first wall.

4. An assembly as set forth in claim 1 wherein the bracket includes a first edge facing the first wall with the first platform extending from the first edge and a second edge facing the second wall with the second platform extending from the second edge such that the first support member is coupled to the first edge and the second support member is coupled to the second edge.

5. An assembly as set forth in claim 4 wherein the bracket includes a first flange adjacent to the first platform for minimizing bending of the bracket.

6. An assembly as set forth in claim 5 wherein the first edge includes a first end and a second end spaced from each other with the first flange disposed between the first platform and the second end of the first edge.

7. An assembly as set forth in claim 4 wherein the bracket includes a second flange adjacent to the second platform for minimizing bending of the bracket.

8. An assembly as set forth in claim 7 wherein the second edge includes a first end and a second end spaced from each other with the second flange disposed between the second platform and the second end of the second edge.

9. An assembly as set forth in claim 1 further including a third wall disposed transverse to the first and second walls to further define the opening with the bracket attached to the third wall for orientating the bracket relative to the first and second walls.

10. An assembly as set forth in claim 9 wherein the bracket includes a plurality of first coupling members spaced from each other for securing the bracket to the third wall with each of the first coupling members being spaced from the first and second platforms.

11. An assembly as set forth in claim 10 wherein the third wall includes a plurality of second coupling members spaced from each other for cooperating with respective first coupling members to secure the bracket to the third wall.

12. An assembly as set forth in claim 11 wherein the first coupling members are further defined as a plurality of hooks and the second coupling members are further defined as a plurality of holes, with the hooks engaging the holes, with the hooks offset from each other for stabilizing the bracket when attached to the third wall and wherein the bracket includes a first edge facing the first wall, a second edge facing the second wall, and a third edge disposed between the first and second edges and facing the third wall with the hooks extending from the third edge.

13. An assembly as set forth in claim 1 wherein at least a portion of the bracket defines a generally I-shaped cross-sectional configuration for providing strength to the bracket.

14. An assembly as set forth in claim 1 wherein the bracket is formed from a polymer.

15. An assembly as set forth in claim 14 wherein the polymer is nylon.

16. An assembly as set forth in claim 1 wherein the first and second support members are each formed from a sealant.

17. An assembly as set forth in claim 16 wherein a volume of the sealant is changeable by from about 200% to about 1,000% when heating the sealant.

18. A vehicle comprising:
a component;
a panel assembly coupled to the component and including:
 a first wall;
 a bracket adjacent to the first wall and having a first platform facing the first wall; and
 a first support member attached to the first platform and defining an initial state and a final state, with the first support member and the first wall defining a first gap therebetween when in the initial state, and the first support member being expandable to contact the first wall to remove the first gap when in the final state for supporting the first wall to prevent deformation of the first wall.

\* \* \* \* \*